No. 616,164. Patented Dec. 20, 1898.
C. E. TOMLINSON.
TROUGH VALVE.
(Application filed July 7, 1898.)
(No Model.)

Witnesses
L. C. Hills
D. E. Warner

By his Attorneys,
Bell and Glasrock

Inventor
C. E. Tomlinson

THE NORRIS PETERS CO., PHOTO-LITHO., WASHINGTON, D. C.

UNITED STATES PATENT OFFICE.

CHARLIE ELWOOD TOMLINSON, OF TALLEYRAND, IOWA.

TROUGH-VALVE.

SPECIFICATION forming part of Letters Patent No. 616,164, dated December 20, 1898.

Application filed July 7, 1898. Serial No. 685,331. (No model.)

*To all whom it may concern:*

Be it known that I, CHARLIE ELWOOD TOMLINSON, a citizen of the United States, residing at Talleyrand, in the county of Keokuk and State of Iowa, have invented certain new and useful Improvements in Trough-Valves; and I do hereby declare the following to be a full, clear, and exact description of the invention, such as will enable others skilled in the art to which it appertains to make and use the same.

My invention has relation to water-troughs; and it consists in the novel construction and arrangement of its parts, as hereinafter described.

The object of my invention is to provide a watering-trough connected with a water-supply tank or other suitable water-supply by means of a pipe, a float being located within the trough, and when the water assumes a certain height in the trough the float will rise and close the end of the pipe, thus cutting off the supply of water.

Figure 1:
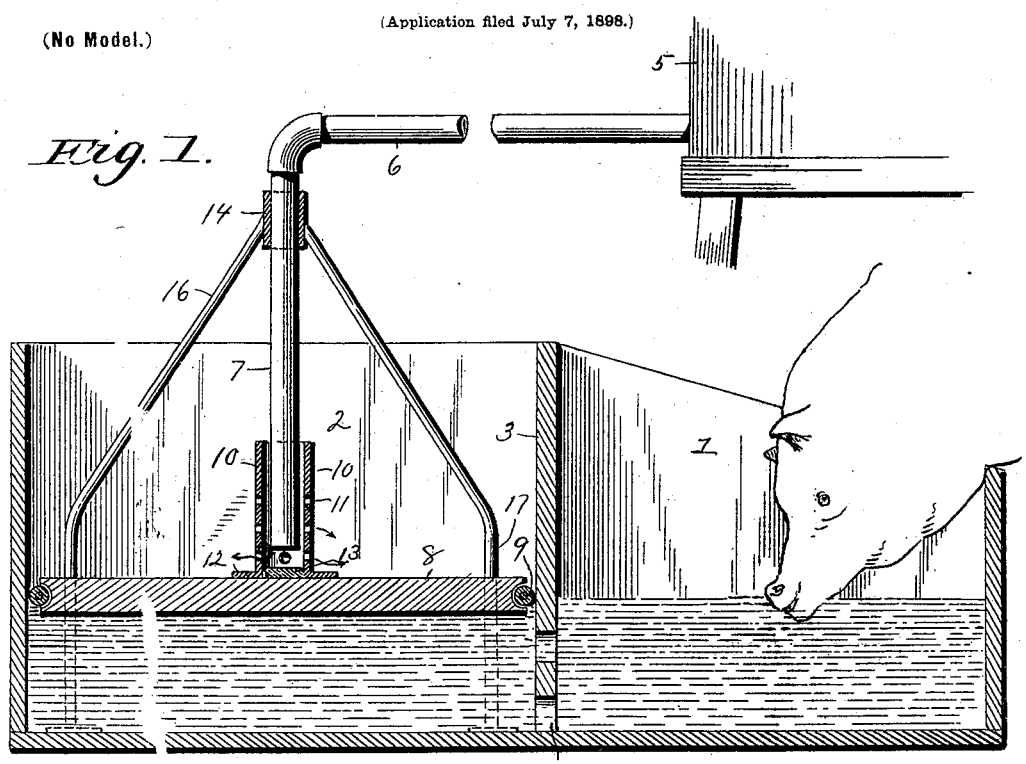
Figure 2:
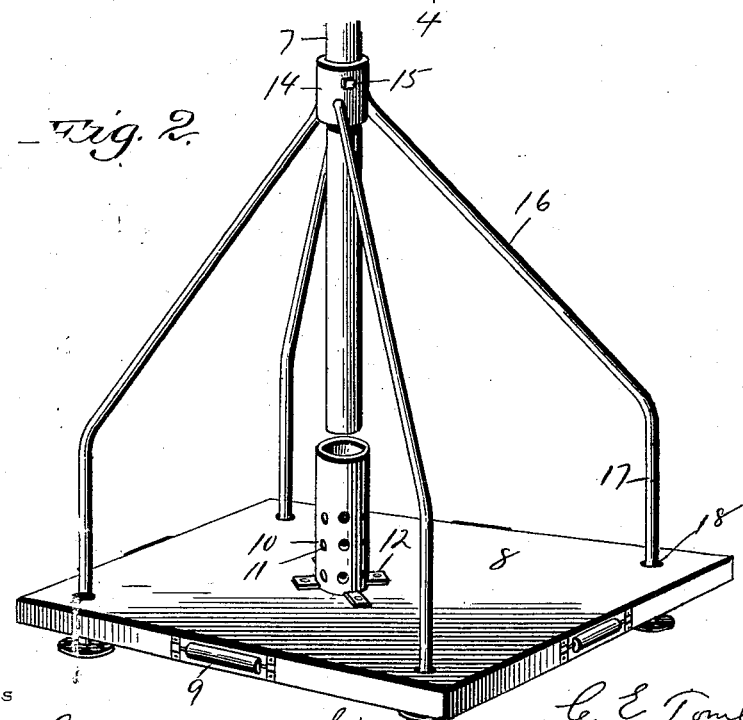

In the accompanying drawings, Figure 1 is a longitudinal sectional view of the trough, and Fig. 2 is a perspective view of the lower end of the supply-pipe and the float.

The trough is provided with a compartment 1, from which the animals may drink the water. The compartment 2 is separated from the compartment 1 by means of the partition 3, the lower portion of said partition being cut away or provided with perforations 4. An elevated tank or other water-reservoir 5 is provided, and the pipe 6 is connected with said tank or water-reservoir. The pipe 6 is provided with a perpendicular section 7, the lower end of said section being open. A float 8 is located in the compartment 2. The said float 8 is preferably made of wood, or it may be made of any other suitable material. Each edge of the said float is provided with a horizontal roller 9, the said rollers being adapted to come in contact with the four walls constituting the compartment 2, and thus reduce the friction between the edges of the float and the side walls of the said compartment, and thereby facilitate the raising and lowering of the said float. The upper side of the float 8 is provided with a cylinder 10, said cylinder being open at its upper end and having in its side suitable perforations 11. The cylinder 10 is provided at its lower end with downwardly-extending lugs 12, by means of which the said cylinder is secured in position upon the upper side of the float 8. The bottom of the cylinder 10 is filled with a packing of felt or rubber 13. The lower end of the pipe-section 7 enters the cylinder 10, as shown in Fig. 1. A band 14 is adjustably secured by means of the set-screw 15 of the pipe-section 7, and the upper ends of the braces 16 are secured to said band 14. The said braces 16 incline out and are then provided with the perpendicular sections 17, the said sections 17 passing through suitable perforations 18, located at or near the corners of the float 8.

The operation of the device is as follows: The parts being assembled as shown in Fig. 1, the stock will drink the water from the compartment 1. As the surface of the water descends the float 8 falls and the packing 13 passes away from the lower end of the pipe-section 7. Thus the water from the reservoir 5 passes the pipe 6 through the pipe-section 7 and enters the cylinder 10 and flows out through the perforations 11 and passes from the edges of the float 8 into the bottom of the compartment 2. The compartments 1 and 2 communicating with each other by means of the perforations 4, the water in the two compartments will be at the same level. As the water rises in the trough the float 8 also rises, and eventually the packing 13 will come in contact with the lower end of the pipe-section 7, thus choking off automatically the water-supply.

Having thus described my invention, what I claim as new, and desire to secure by Letters Patent, is—

1. In combination with a trough and a reservoir, a pipe connected at one end to the reservoir, said pipe having at its lower end a downwardly-extending section entering the trough, a float located in the trough, a cylinder located upon the upper surface of the float, said cylinder having suitable perforations, braces connected at their upper ends to the pipe and at their lower ends to the bottom of the trough, said braces passing through perforations in the float.

2. In combination with a trough and a reservoir, a pipe connected at one end to said reservoir, said pipe having at its other end a downwardly-extending section entering the trough, a float located in the trough, a cylinder located on the upper surface of the float, said cylinder having suitable perforations, a ring adapted to be adjustably secured to the downwardly-extending pipe-section, braces fixed at their upper ends to said ring and inclining in their upper portions away from the pipe-section, the lower portions of said braces being perpendicular and passing through perforations in the float, the lower ends of said braces being connected to the bottom of the trough.

3. In combination with a trough and a reservoir, a pipe connected at one end to said reservoir, said pipe having at its other end a downwardly-extending section entering the trough, a float located in the trough, rollers journaled at the edges of the float, said rollers being adapted to come in contact with the perpendicular sides of the trough, a cylinder located on the upper surface of the float, said cylinder having suitable perforations, the lower end of the downwardly-extending pipe-section entering said cylinder.

In testimony whereof I affix my signature in presence of two witnesses.

CHARLIE ELWOOD TOMLINSON.

Witnesses:
D. W. HAMILTON,
WM. A. BELL.